United States Patent
Margulieux

(10) Patent No.: US 6,832,186 B1
(45) Date of Patent: Dec. 14, 2004

(54) PERSISTENT EMULATED DATA STORAGE USING DEDICATED STORAGE IN A TARGET MODE DISK EMULATOR

(75) Inventor: Gordon Margulieux, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 09/680,545

(22) Filed: Oct. 4, 2000

(51) Int. Cl.$^7$ .............................................. G06F 9/455
(52) U.S. Cl. ............................ 703/24; 703/21; 714/28; 714/29; 712/227
(58) Field of Search ..................... 703/21–28; 712/227; 714/28, 29, 38; 711/103, 202, 207

(56) References Cited

U.S. PATENT DOCUMENTS

| | | | | |
|---|---|---|---|---|
| 5,025,364 A | * | 6/1991 | Zellmer ........................ | 703/23 |
| 5,832,251 A | * | 11/1998 | Takahashi ..................... | 703/23 |
| 5,838,952 A | * | 11/1998 | Okano et al. ................... | 703/23 |
| 5,873,129 A | * | 2/1999 | Bealkowski ................... | 711/207 |
| 5,903,719 A | * | 5/1999 | Yamamoto .................... | 714/38 |
| 6,009,261 A | * | 12/1999 | Scalzi et al. ................... | 703/26 |
| 6,063,131 A | * | 5/2000 | Yoshida ........................ | 703/23 |
| 6,480,845 B1 | * | 11/2002 | Egolf et al. .................... | 707/6 |
| 6,571,356 B1 | * | 5/2003 | Mehr et al. .................... | 714/28 |
| 6,574,588 B1 | * | 6/2003 | Shapiro et al. ................ | 703/24 |
| 6,578,127 B1 | * | 6/2003 | Sinclair ........................ | 711/202 |

FOREIGN PATENT DOCUMENTS

| | | | | | |
|---|---|---|---|---|---|
| JP | 04289470 A | * | 10/1992 | ........... | G01R/31/28 |
| JP | 11175366 A | * | 7/1999 | ........... | G06F/11/22 |

* cited by examiner

*Primary Examiner*—Anthony Knight
*Assistant Examiner*—Crystal Barnes

(57) ABSTRACT

The present invention relates to a system and method for emulating the operation of storage devices deployed in a host computer system. The inventive approach preferably involves the use of an emulator employing storage space and equipment specifically allocated for the emulation of particular storage devices associated with the host computer. Emulating storage devices preferably preserve their data through various possible power cycling operations of the emulated devices. The emulating or emulator devices may generally be disposed inside or outside of the emulator housing.

20 Claims, 2 Drawing Sheets

PERSISTENT EMULATED DATA STORAGE USING DEDICATED STORAGE IN A TARGET MODE DISK EMULATOR

RELATED APPLICATIONS

The present application is related to pending, commonly assigned, and concurrently filed U.S. patent application Ser. No. 09/680,544 entitled "EMULATION OF DYNAMICALLY RECONFIGURABLE COMPUTER SYSTEM," filed Oct. 4, 2000, which is hereby incorporated herein by reference.

TECHNICAL FIELD

The present invention relates in general to emulation of computer peripheral devices and, in particular, to emulating persistent storage of data in peripheral devices having data storage capabilities.

BACKGROUND

When constructing data processing or communication equipment, it is generally desirable to emulate the operation of various components and the interaction of these components with each other before all such components are available for actual physical testing. Such emulation generally enables the identification of potential fault conditions to be identified and the exercise of software within host devices designed to identify and respond to fault conditions originating within peripheral or other devices. In addition to enabling testing of system components by emulating such components, emulators generally enable the testing of diagnostic features of a computer system by deliberately injecting invalid data into the system to prompt for a response by diagnostic elements of a computer system.

Emulation is commonly accomplished through the use of an emulating computer connected to a computer system under test. Various components of the computer under test may be emulated by the emulating computer which may be coupled to the computer under test employing standard communication mechanisms. One such component is that of data storage, and in particular, non-volatile data storage. Generally, emulation of non-volatile computer storage computer storage is accomplished by employing data storage equipment already employed for the ongoing operation of the emulating computer. In this case however, the emulated data storage operations compete for resources, within the emulating device, with the data storage requirements of the emulating computer's operating system, thereby limiting the effectiveness of this approach to data storage emulation.

FIG. 1 is a block diagram 100 depicting a system for emulating host device data storage equipment according to a prior art solution. It may be seen that host device 101 communicates with conventional emulator 102 via communication line 104. Internal shared storage 103 is the storage available for emulation in the system of FIG. 1. Generally, internal shared storage is provided by standard non-volatile computer storage equipment, such as a hard disk drive. Generally, emulator 102, which may be a general purpose computer, uses storage 103 for its own purposes, including storage of its own operating system, application programs, log files, and other miscellaneous data. Accordingly, any use of shared storage 103 for the purpose of emulating host device storage equipment must generally compete with the above-stated needs of emulator 102, thereby limiting the resources available for emulation purposes.

Generally, at the conclusion of each emulation operation, the data stored in an appropriately designated portion of the shared memory 103 is reset in preparation for a subsequent emulation operation. Accordingly, any emulation related data stored in the shared memory is generally lost once a particular emulation session has concluded. Thereafter, if the host device wishes to emulate a return to the storage device which was previously emulated, all data associated the previous emulation operation will have generally been deleted, thereby defeating an ability to emulate a normal resumption of interaction of the host device with the first storage device, after having accessed one or more other storage devices.

In addition, the sharing of data storage resources in prior art systems tends to make it difficult to determine in advance how much data in shared storage 103 is available for host device storage device emulation. Moreover, the sharing of the available capacity in shared resource 103 will generally prevent the emulation process from employing the full capacity of shared resource 103 for emulation purposes. Accordingly, the emulation of host device 101 storage devices will generally be limited to storage equipment of modest storage capacity in order to abide by the limitations imposed the need to share resources with emulator 102.

Accordingly, it is a problem in the art that storage resources employed for emulating host device storage equipment are generally shared with equipment employed for emulating logical operation of the host device storage equipment.

It is a further problem in the art that emulation data stored during an initial emulation session is generally reset upon conclusion of the initial session, thereby preventing emulation of a normal resumption of access to an actual host device storage device.

It is a still further problem in the art that the sharing of data storage resources with emulation equipment generally limits the data storage capacity of equipment which may be emulated employing the systems of the prior art.

SUMMARY OF THE INVENTION

The present invention is directed to a system and method which provides persistent non-volatile dedicated emulated storage for enabling emulation of storage equipment which may be intermittently accessed and cycled through various power conditions. The inventive approach preferably dedicates at least one emulating storage device to the emulation of a storage device to be emulated, wherein the dedicated storage device is enabled to provide data storage which remains intact through one or more different emulation operations conducted by an emulator to which the dedicated component is coupled, and one or more possible power cycling operations of the emulated storage device.

In a preferred embodiment, the dedicated device(s) coupled to the emulator to enable more realistic storage device emulation may be a hard disk drive, magneto optic device, tape drive, CD-RW (read-write compact disk), or other non-volatile storage mechanism. Although the emulating device need not be the same as the emulated device (the device native to the host computer), there is generally some advantage in having the characteristics of the two devices approximate one another. For example, when emulating the operation of a 10 megabyte disk drive, use of a disk drive with a capacity approaching 10 megabytes and having other operating characteristics in common with the emulated device will generally provide for a more accurate emulation process.

In a preferred embodiment, the deployment of an emulator, which may be a general purpose computer, as an intermediary device between a host device and one or more emulating devices preferably enables a more seamless emulation process than an arrangement in which the emulating devices are directly coupled to the host device or other external device. Disposing an emulator in between a host device and one or more emulating devices preferably enables the host device to interact seamlessly with the emulating devices. The emulator preferably provides convenient means for transferring control data and storage data from the host device to the one or more emulating storage devices. Moreover, the deployment of an emulator preferably enables a host device, communicating along a single communication line with an emulator, to interact with a substantial number of emulated storage devices.

Accordingly, it is an advantage of a preferred embodiment of the present invention that data stored employing a dedicated emulating storage device will be preserved after emulated power cycling of the storage device being emulated.

It is a further advantage of a preferred embodiment of the present invention that a dedicated storage device coupled to an emulator may be selected and configured so as to enable highly accurate approximation of the characteristics of the device being emulated.

It is a still further advantage of a preferred embodiment of the present invention that a dedicated storage device having a storage capacity closely approximating that of the device being emulated may be selected.

It is a still further advantage of a preferred embodiment of the present invention that the resources available to an emulating dedicated storage device are generally independent of the storage space needed to service the needs of the emulating computer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 2:
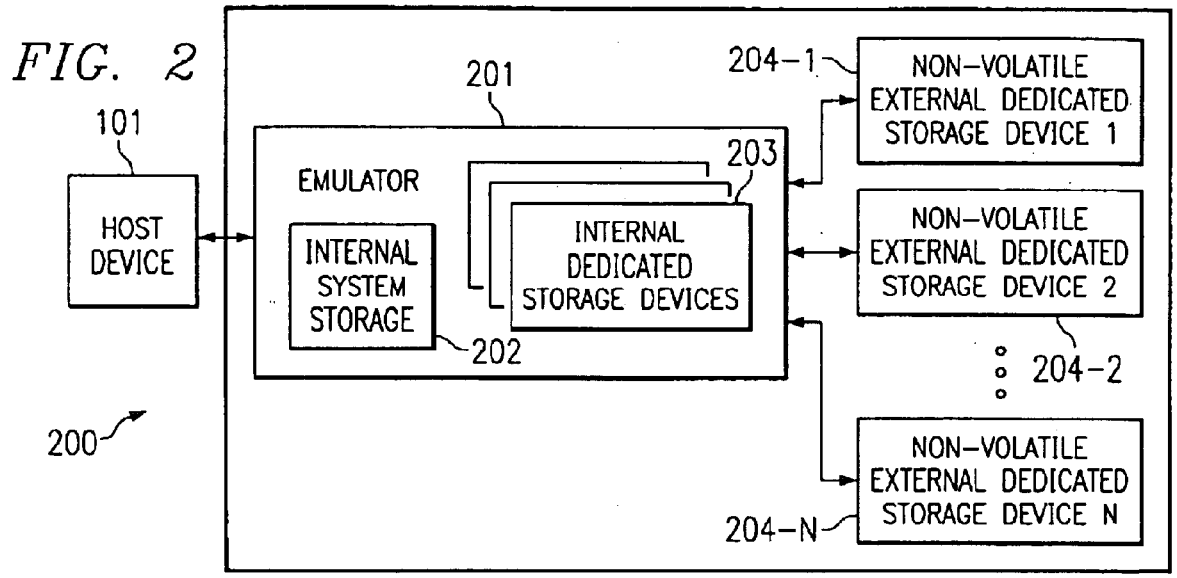
FIG. 2 depicts a system for conducting storage device emulation employing dedicated storage equipment according to a preferred embodiment of the present invention.

FIG. 2 depicts a system 200 for conducting storage device emulation employing dedicated storage equipment according to a preferred embodiment of the present invention.

In a preferred embodiment, emulator 201 employs internal system storage 202 substantially exclusively for the operating system, application programs, and data associated with the operation of emulator or emulating computer 201 and not for emulating host device storage. Emulation of host device storage operations is preferably provided by external dedicated storage components 204-1 and 204-2. As FIG. 2 indicates, an essentially unlimited number of external dedicated storage devices may be connected to emulator 201, as shown by the dots leading up to non-volatile external dedicated storage device N 204-N.

Figure 1:
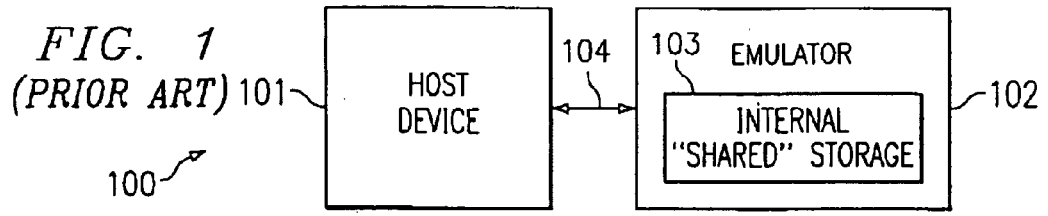
FIG. 1 is a block diagram depicting a system for emulating host device data storage equipment according to a prior art solution.

In a preferred embodiment, the storage components dedicated to emulation of host device 101 storage activity are not limited to being disposed externally to emulator 201. Optionally, internal non-volatile dedicated storage device 203 may be deployed internal to emulator 201 and operate in substantially the same manner as devices 204-1 to 204-N. Thus, in the embodiment depicted in FIG. 2, the storage operations specific to the operation of emulator 201 and those dedicated to emulation of host device 101 storage activity are preferably distributed among separate physical components. Such segregation of activity preferably enables the various dedicated storage devices, whether internal or external, to operate free of the constraints imposed by the prior art storage sharing system depicted in FIG. 1.

In a preferred embodiment, the dedicated storage devices 203 and 204-1 to 204-N may be selected so as to best match the host device storage devices they are intended to emulate. Alternatively, a substantially generic set of dedicated storage devices 203 and 204-1 to 204-N may be selected and configured in software to emulate, as accurately as possible, the storage devices to be deployed with host device 101.

In a preferred embodiment, emulator 201 coordinates the communication of control information, storage data, and optionally, power supply information between host device 101 and the dedicated storage devices. Control information preferably indicates a destination for storage data transmitted from host device 101 toward emulator 201, and alternatively, a source of retrieved storage information directed from emulator 201 toward host device 101.

In an exemplary sequence of events, host device 101 may interact with dedicated storage device 204-1 and leave data therein, and then operate to retrieve data from another device, such as dedicated storage device 203. Upon regaining access to external dedicated storage device 204-1, the data left therein when the host device 101 was previously in communication therewith, will preferably be preserved unchanged. In this manner, the present invention provides for more realistic emulation than would have been possible employing the prior art "shared storage" where data would be erased by switching from emulation of one storage device to another by an emulator reset operation. In the embodiment of FIG. 2, emulator 201 enables the host device to successively access a sequence of different emulating storage devices, while each of the emulating storage devices preserves data stored therein between successive emulation sessions with the host.

Figure 3:
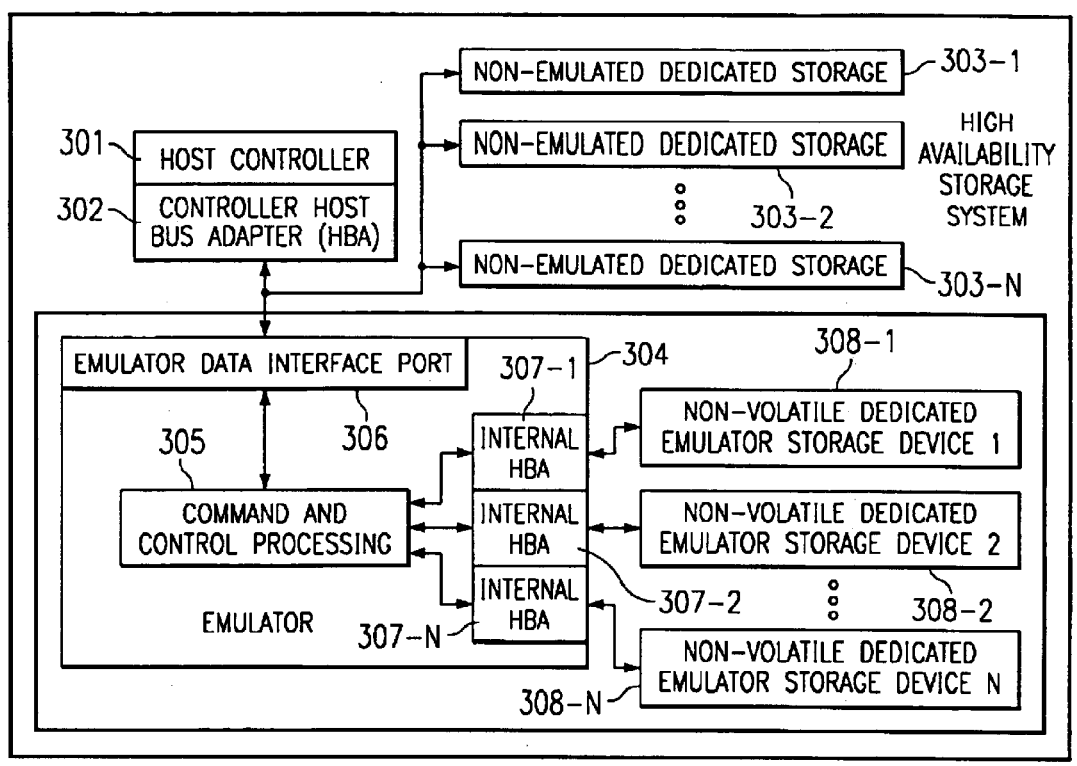
FIG. 3 depicts the system for storage device emulation of FIG. 2 in greater detail according to a preferred embodiment of the present invention.

FIG. 3 depicts a typical target mode emulator program 300 within a high availability storage system. Host controller 301 is generally a subset of host device 101 depicted in FIG. 2. In a preferred embodiment, the upper portion of the FIGURE represents components of host computer. The host computer preferably includes host controller 301 that is attached to a host BUS adapter 302 (HBA) which preferably coordinates communication with the emulator 304. The host computer also preferably includes non-emulated dedicated storage devices 303-1 to 303-N which preferably remain operative and under the control of host controller 301. Generally, the emulation process will involve emulating one of the non-emulated dedicated storage devices 303-1 to 303-N (storage devices native to the host computer system) at a time employing one or more of the non-volatile dedicated emulator storage devices 308-1 to 308-N.

Figure 4:
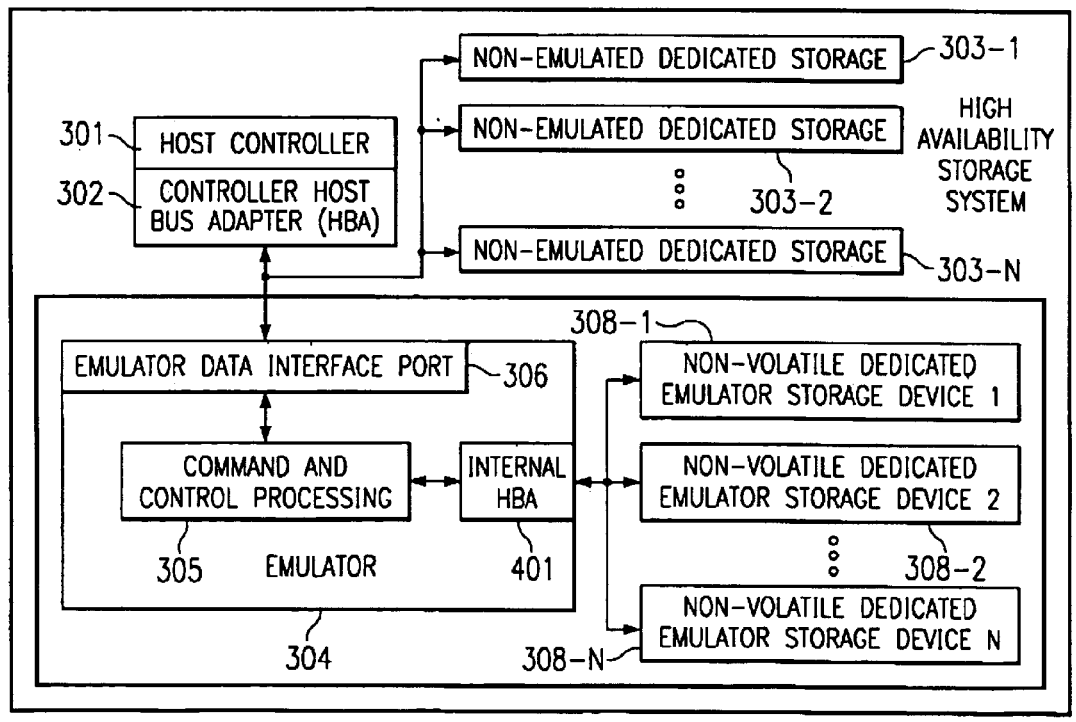
FIG. 4 depicts the system for storage device emulation of FIG. 3 employing a modified host bus adaptor port implementation according to a preferred embodiment of the present invention.

In a preferred embodiment, emulator 304, which preferably includes emulator data interface port 306, is coupled to the controller HBA 302. Within emulator 304, command and control processing 305 preferably coordinates communication between emulator data interface port 306 and internal host bus adaptor (HBA) ports 307-1 to 307-N. Although the embodiment of FIG. 3 depicts a deployment of one HBA port for each non-volatile dedicated storage device, in an alternative embodiment, a single HBA port may be deployed to interface with all deployed non-volatile emulator storage devices. Such an alternative embodiment 400 is shown in FIG. 4.

In a preferred embodiment, host controller 301 is a custom board which forms a portion of a larger computer system. Preferably, where a custom board is deployed, this board would be configured for interacting with and controlling a plurality of data storage devices. Alternatively, the host controller 301 could be any computer system. Similarly, the emulator 304 is preferably a personal computer, but alternatively could be any computer system.

Non-volatile dedicated emulator storage devices 308-1 to 308-N could be dedicated hard disk drives coupled to emulator 304. Alternatively, dedicated storage devices 308-1 to 308-N could any other form of non-volatile storage equipment including but not limited to tape drives, magneto-optic devices, and CD-RW (readable, writeable compact disk drives). The dedicated storage devices may be disposed externally to the emulator 304 or within an enclosure also housing emulator 304.

In a preferred embodiment, the emulator storage devices may be selected so as to most accurately reflect the operating characteristics of the device being emulated. Employing this approach, the emulating device should accurately approximate the behavior of the device being emulated. Alternatively, emulating devices whose characteristics vary in selected respects from the device being emulated may be selected in order to deliberately cause selected errors and/or exception conditions to occur. In this manner, the response of diagnostic code within the host controller 301 may be exercised with greater frequency than where the emulating device and emulated device are highly similar. By varying the functional disparity between the emulated and emulating devices in successive emulation operations, the inventive approach may be effective in exercising a considerable range of diagnostic code functions, thereby enabling a more complete examination of the operation of the diagnostic code within host controller 302.

Figure 5:
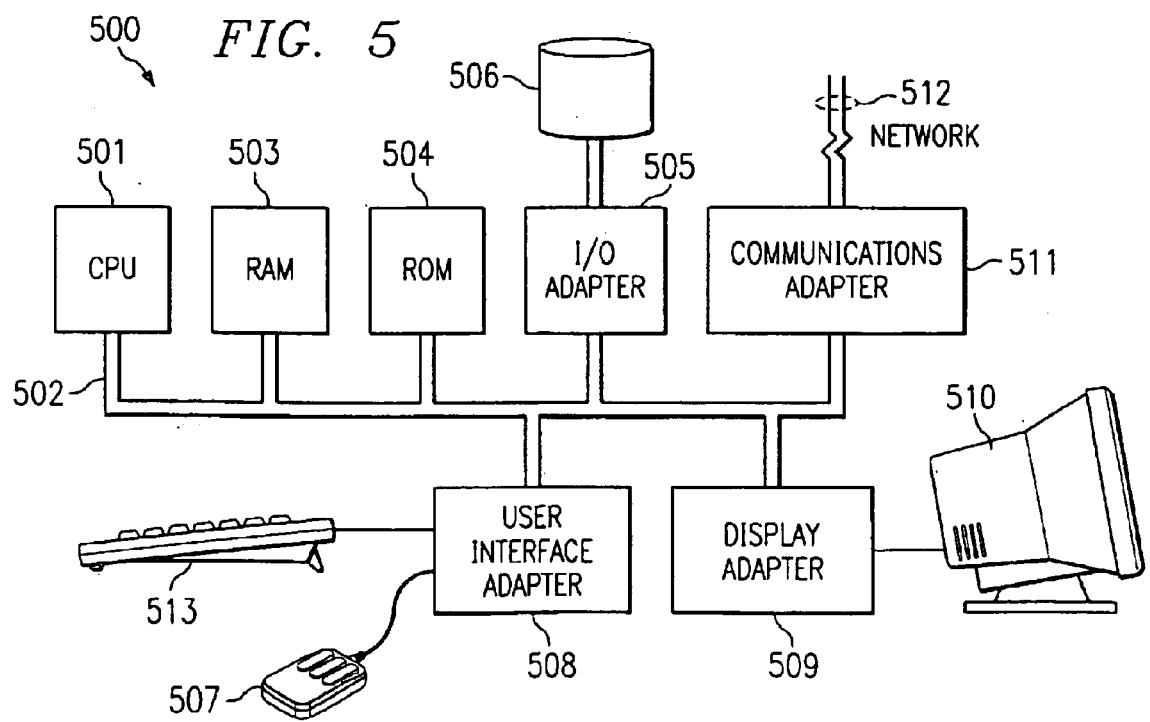
FIG. 5 depicts computer apparatus adaptable for use with the present invention.

FIG. 5 depicts computer apparatus adaptable for use with a preferred embodiment of the present invention. FIG. 5 illustrates computer system 500 adaptable for use with a preferred embodiment of the present invention. Central processing unit (CPU) 501 is coupled to system bus 502. The CPU 501 may be any general purpose CPU, such as an HP PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM RAM 503 and ROM 504 hold user and system data and programs as is well known in the art.

The bus 502 is also coupled to input/output (I/O) adapter 505, communications adapter card 511, user interface adapter 508, and display adapter 509. The I/O adapter 505 connects to storage devices 506, such as one or more of hard drive, CD drive, floppy disk drive, tape drive, to the computer system. Communications adapter 511 is adapted to couple the computer system 500 to a network 512, which may be one or more of local (LAN), wide-area (WAN), Ethernet or Internet network. User interface adapter 508 couples user input devices, such as keyboard 513 and pointing device 507, to the computer system 500. The display adapter 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing accurate data storage emulation in a computer system, the system comprising:

a host computer system having at least one storage system;

an emulating computer in communication with said host computer system; and an emulating storage system in communication with said emulating computer dedicated to emulation of an operation of at least one of said at least one storage systems.

2. The system of claim 1 wherein said emulating storage system is disposed within an enclosure housing said emulating computer.

3. The system of claim 1 wherein said emulating storage system is located externally to an enclosure housing said emulating computer.

4. The system of claim 1 further comprising:

at least one additional emulating storage system.

5. The system of claim 1 wherein said emulating storage system includes operating characteristics approximating operating characteristics of said at least one storage system of said host computer.

6. The system of claim 1 further comprising:

means for preserving data stored in said emulating storage system during emulated power cycling of said emulating storage system.

7. The system of claim 1 wherein said at least one storage system comprises:

a hard disk drive having a storage capacity; and said emulating storage system comprises:

a hard disk drive having a storage capacity substantially equal to said storage capacity of said hard disk drive.

8. The system of claim 1 wherein said emulated storage system substantially excludes data pertaining to internal operation of said emulating computer.

9. A method for accurately emulating host computer data storage, the method comprising the steps of:

providing a host computer system capable of interacting with at least one storage system native to said host computer system;

disposing an emulating computer in communication with said provided host computer system;

coupling an emulating storage system to said disposed emulating computer; and dedicating said coupled emulating storage system to emulation of said at least one storage system native to said host computer system.

10. The method of claim 9 further comprising the step of:

excluding data associated with an internal operation of said emulating computer from said dedicated coupled emulating storage system.

11. The method of claim 9 further comprising the step of:

disposing said coupled emulating storage system within an enclosure housing said emulating computer.

12. The method of claim 9 further comprising the step of:

disposing said coupled emulating storage system outside an enclosure housing said emulating computer.

13. The method of claim 9 further comprising the step of:

dedicating each of a plurality of emulating storage devices to a separate one of said at least one storage devices native to said host computer system.

14. The method of claim 13 further comprising the step of:

emulating a succession of said at least one storage device native to said host computer system employing a succession of said plurality of dedicated emulating storage devices.

15. The method of claim 14 further comprising the step of:

preserving data stored in said plurality of dedicated emulating storage devices while said succession of said at least one storage devices native to said host computer system is emulated.

16. A system for emulating an operation of at least one storage device adapted for operation with a host computer system, the system comprising:

means for dedicating an emulating storage device to each of said at least one storage devices adapted for operation with said host computer system, thereby establishing at least one dedicated emulating storage device;

means for coupling said at least one dedicated emulating storage device to said host computer via an intelligent interface; and means for monitoring an operation of said at least one dedicated emulating storage device.

17. The system of claim 16 wherein said monitoring means comprises:

means for diagnosing a fault condition among said at least one dedicated emulating storage devices.

18. The system of claim 17 wherein said monitoring means further comprises:

means for performing diagnostic operations in response to said diagnosed fault condition.

19. The system of claim 16 wherein said means for dedicating comprises:

selecting said at least one dedicated emulating storage device having operating characteristics approximating operating characteristics of said at least one storage device adapted for operation with said host computer system.

20. The system of claim 16 wherein said intelligent interface is a computer.

\* \* \* \* \*